US011628609B2

(12) United States Patent
Horiuchi

(10) Patent No.: US 11,628,609 B2
(45) Date of Patent: Apr. 18, 2023

(54) STATE DETERMINATION DEVICE AND METHOD

(71) Applicant: FANUC Corporation, Yamanashi (JP)

(72) Inventor: Atsushi Horiuchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 832 days.

(21) Appl. No.: 16/594,092

(22) Filed: Oct. 7, 2019

(65) Prior Publication Data

US 2020/0130246 A1 Apr. 30, 2020

(30) Foreign Application Priority Data

Oct. 25, 2018 (JP) .............................. JP2018-200692

(51) Int. Cl.
*B29C 45/76* (2006.01)
*G06N 20/00* (2019.01)
(Continued)

(52) U.S. Cl.
CPC ............ *B29C 45/768* (2013.01); *B29C 45/76* (2013.01); *G06K 9/6227* (2013.01); *G06K 9/6267* (2013.01); *G06K 9/6273* (2013.01); *G06N 3/08* (2013.01); *G06N 3/088* (2013.01); *G06N 20/00* (2019.01); *B29C 45/766* (2013.01); *B29C 2945/76* (2013.01); *B29C 2945/76066* (2013.01); *B29C 2945/76163* (2013.01); *B29C 2945/76949* (2013.01); *G05B 23/0283* (2013.01); *G06N 3/006* (2013.01); *G06N 3/0445* (2013.01); *G06N 3/0454* (2013.01)

(58) Field of Classification Search
CPC ...... B29C 2945/76; B29C 2945/76066; B29C 2945/76163; B29C 2945/76949; B29C 45/76; B29C 45/766; B29C 45/768; G05B 23/0283; G06K 9/6227; G06K 9/6267; G06K 9/6273; G06N 20/00; G06N 3/006; G06N 3/0445; G06N 3/0454; G06N 3/08; G06N 3/088
See application file for complete search history.

(56) References Cited

U.S. PATENT DOCUMENTS 5,153,149 A 10/1992 Naito et al.
6,567,709 B1 * 5/2003 Malm ................ G05B 23/0267
700/169

(Continued)

FOREIGN PATENT DOCUMENTS

CN 106409120 A 2/2017
CN 106779069 A 5/2017

(Continued)

*Primary Examiner* — Kidest Bahta
(74) *Attorney, Agent, or Firm* — Hauptman Ham, LLP

(57) ABSTRACT

A state determination device acquires data on an injection molding machine and stores conditions for classifying the acquired data on the injection molding machine and a plurality of learning models. The state determination device further classifies the acquired data based on the stored classification conditions and settles a learning model to which the classified data are applied, among the plurality of stored learning models. Subsequently, the state determination device performs machine learning for the learning model settled as an application destination, based on the classified data.

11 Claims, 5 Drawing Sheets

(51) Int. Cl.
  *G06K 9/62*  (2022.01)
  *G06N 3/088* (2023.01)
  *G06N 3/08*  (2023.01)
  *G06N 3/006*  (2023.01)
  *G06N 3/04*   (2023.01)
  *G05B 23/02*  (2006.01)

(56) References Cited

U.S. PATENT DOCUMENTS

| | | | |
|---|---|---|---|
| 10,203,666 B2 | 2/2019 | Takahashi et al. | |
| 2004/0093114 A1* | 5/2004 | Magario | G05B 15/02 |
| | | | 700/197 |
| 2006/0161291 A1 | 7/2006 | Ikeda et al. | |
| 2015/0099026 A1* | 4/2015 | Shiraishi | B29C 45/77 |
| | | | 425/170 |
| 2017/0028593 A1* | 2/2017 | Maruyama | B29C 37/0096 |
| 2017/0031330 A1 | 2/2017 | Shiraishi et al. | |
| 2017/0326771 A1 | 11/2017 | Uchiyama | |
| 2018/0164781 A1* | 6/2018 | Kubo | G05B 13/026 |
| 2018/0181694 A1 | 6/2018 | Springer et al. | |
| 2018/0264613 A1 | 9/2018 | Tamai et al. | |
| 2018/0281256 A1 | 10/2018 | Asaoka et al. | |
| 2019/0118443 A1 | 4/2019 | Asaoka et al. | |
| 2019/0265657 A1 | 8/2019 | Inagaki et al. | |

FOREIGN PATENT DOCUMENTS

| | | |
|---|---|---|
| CN | 107784322 A | 3/2018 |
| CN | 108237670 A | 7/2018 |
| CN | 108628253 A | 10/2018 |
| CN | 108688105 A | 10/2018 |
| CN | 109693354 A | 4/2019 |
| JP | H1-168421 A | 7/1989 |
| JP | 2006192773 A | 7/2006 |
| JP | 2014-104689 A | 6/2014 |
| JP | 6031202 B1 | 11/2016 |
| JP | 2017-30221 A | 2/2017 |
| JP | 201730152 A | 2/2017 |
| JP | 2017132260 A | 8/2017 |
| JP | 2017-202632 A | 11/2017 |
| JP | 201815937 A | 2/2018 |
| JP | WO2018135443 A1 | 11/2019 |

* cited by examiner

| CLASSIFICATION CONDITIONAL EXPRESSION | LEARNING MODEL |
|---|---|
| MOLDING PROCESS = MOLD CLOSING | LEARNING MODEL A |
| MOLDING PROCESS = INJECTION + DWELLING | LEARNING MODEL B |
| MOLDING PROCESS = METERING + EJECTION + MOLD OPENING | LEARNING MODEL C |
| MOLDING PROCESS = METERING | LEARNING MODEL D |
| MOLDING PROCESS = EJECTION + MOLD OPENING | LEARNING MODEL E |
| ... | ... |

| TIME [ms] | IDENTIFICATION INFORMATION ON MOLDING PROCESS | CURRENT [A] | SPEED [mm/s] | PRESSURE [MPa] |
|---|---|---|---|---|
| $t_1$ | 1 | 0.2 | 2 | 0 |
| ... | ⋮ | ... | ... | ... |
| $t_i$ | 1 | 0.8 | 4 | 1 |
| $t_{i+1}$ | 2 | 0.7 | 5 | 5 |
| ... | ⋮ | ... | ... | ... |
| $t_j$ | 2 | 0.5 | 7 | 9 |
| $t_{j+1}$ | 3 | 0.4 | 8 | 12 |
| ... | ⋮ | ... | ... | ... |
| $t_k$ | 3 | 0.3 | 11 | 15 |
| $t_{k+1}$ | 4 | 0.4 | 13 | 17 |
| ... | ... | ... | ... | ... |

FIG. 6

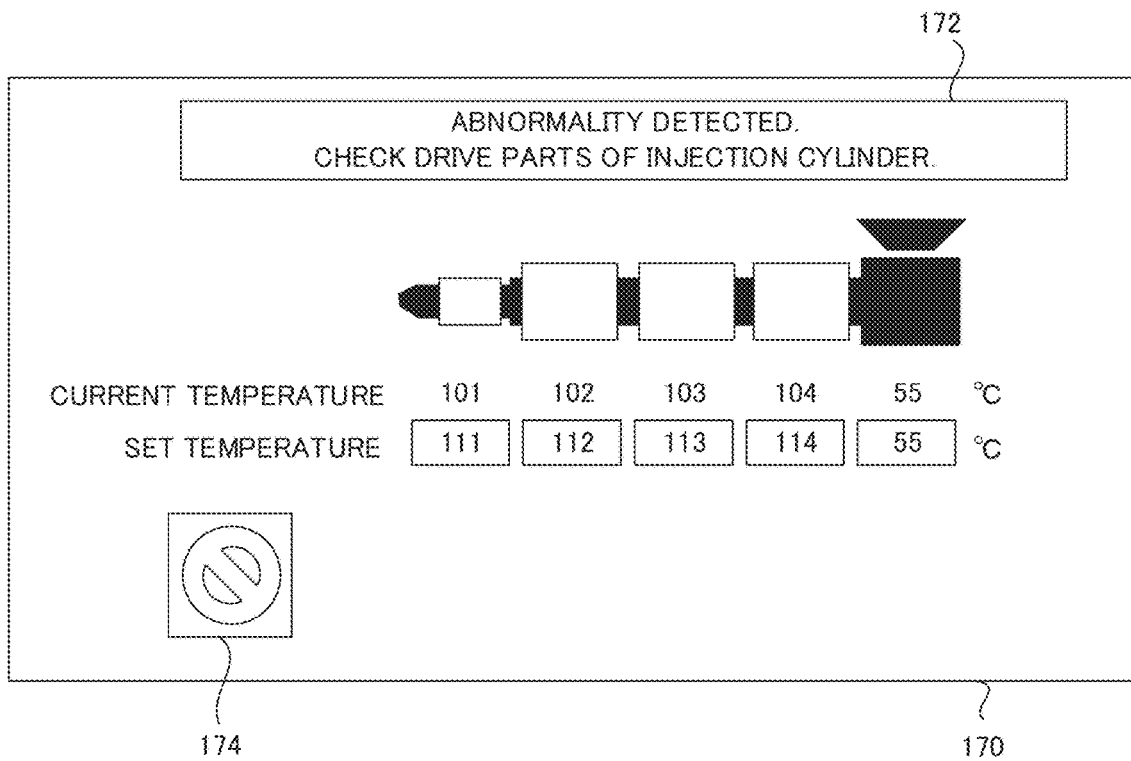

FIG. 7

| CLASSIFICATION CONDITIONAL EXPRESSION | LEARNING MODEL |
|---|---|
| FOR EACH CYCLE | LEARNING MODEL A (FOR HIGH-URGENCY ABNORMALITY DETECTION) |
| FOR EACH 2 CYCLES | LEARNING MODEL B (FOR SLIGHTLY-HIGH-URGENCY ABNORMALITY DETECTION) |
| FOR EACH 10 CYCLES | LEARNING MODEL C (FOR NORMAL-URGENCY ABNORMALITY DETECTION) |
| FOR EACH 50 CYCLES | LEARNING MODEL D (FOR SLIGHTLY-LOW-URGENCY ABNORMALITY DETECTION) |
| FOR EACH 100 CYCLES | LEARNING MODEL E (FOR LOW-URGENCY ABNORMALITY DETECTION) |
| ... | ... |

STATE DETERMINATION DEVICE AND METHOD

RELATED APPLICATIONS

The present application claims priority to Japanese Patent Application Number 2018-200692 filed on Oct. 25, 2018, the disclosure of which is hereby incorporated by reference herein in its entirety.

BACKGROUND OF THE INVENTION

Field of the Invention

The present invention relates to a state determination device and method, and more particularly, to a state determination device and method for supporting maintenance of injection molding machines.

Description of the Related Art

Maintenance of an industrial machine, such as an injection molding machine, is performed regularly or on the occurrence of an abnormality. In maintaining the industrial machine, a maintenance personnel determines the abnormality of the operating state of the industrial machine by using physical quantities indicative of the machine operating state having been recorded during the operation of the machine, and performs maintenance work such as replacement of abnormal components.

For maintenance work for a check valve of an injection cylinder of the injection molding machine, for example, there is a known method in which a screw is regularly removed from the injection cylinder so that the dimensions of the check valve can be directly measured. In this method, however, production must be suspended for the measurement work, so that the productivity is inevitably reduced. Besides the injection cylinder, components to be subjected to maintenance work include various drive components, such as a motor, ball screw, and belt, of an injection device, mold clamping device, molded-product ejecting device, and the like that comprise the injection cylinder.

As a conventional technology for solving this problem, there is a known method of abnormality diagnosis. In this method, an abnormality is diagnosed by indirectly detecting a wear amount of the check valve of the injection cylinder without suspending the production for the removal of the screw from the injection cylinder or the like. Also, in this diagnosis method, the abnormality can be diagnosed by detecting a rotational torque on the screw or a phenomenon that a resin flows backward relative to the screw.

For example, U.S. Pat. No. 5,153,149 (corresponding to Japanese Patent Application Laid-Open No. H1-168421) discloses a method in which a rotational torque influential on a screw rotation method is measured and an abnormality is identified if a tolerance range is exceeded by the measured torque. Also, Japanese Patent Application Laid-Open No. 2014-104689 discloses a method in which the necessity of maintenance and inspection is determined by comparing an actually measured stress difference and a tolerance.

Moreover, U.S. Unexamined Patent Application Publication No. 2017/0028593 (corresponding to Japanese Patent Application Laid-Open No. 2017-030221) and U.S. Unexamined Patent Application Publication No. 2017/0326771 (corresponding to Japanese Patent Application Laid-Open No. 2017-202632) disclose methods in which an abnormality is diagnosed by supervised learning of a drive part load, resin pressure and the like.

Furthermore, U.S. Pat. No. 10,203,666 (corresponding to Japanese Patent No. 6031202) discloses a method in which an abnormality is discovered by acquiring internal information of a plurality of manufacturing machines and comparing differences between the pieces of internal information acquired from the individual manufacturing machines.

Drive units included in each injection molding machine operate in association with a plurality of molding processes, such as mold opening, mold closing, injection, dwelling and metering processes, in which the injection molding machine manufactures molded products. The abnormality of the drive parts often occurs during the molding processes associated with the drive parts concerned. According to the prior art, however, combinations of the drive parts and the molding processes are not taken into consideration, so that the abnormality of the operating state of the injection molding machine cannot be correctly estimated. For example, the abnormality of the injection cylinder should only be determined in the injection, dwelling, and metering processes in which the injection cylinder is driven, and the determination of the abnormality of the injection cylinder in the mold closing and mold opening processes in which the injection cylinder is not driven may possibly be erroneous. Thus, there is a problem that the accuracy of determination of the abnormality of the operating state is reduced or the abnormality of the operating state cannot be correctly estimated if the combinations of the drive parts and the molding processes that do not require determination exist in a mixed manner.

Moreover, periods during which the components that constitute the drive parts are exhausted or damaged vary depending on the characteristics of the components. For example, breakage of a belt that drives the injection cylinder sometimes occurs suddenly, so that the occurrence of an abnormality must be monitored constantly. Since the check valve of the injection cylinder is a consumable part that is gradually exhausted during a long-term operation, it is to be desired that its abnormality be determined intermittently for a long period.

Furthermore, in order to determine the abnormality of a plurality of constituent parts, it is generally necessary to provide a plurality of state determination devices corresponding individually to the parts, so that there is a cost problem. Also, there is a problem that general-purpose abnormality determination cannot be achieved for components that constitute a plurality of drive parts.

SUMMARY OF THE INVENTION

Accordingly, the object of the present invention is to provide a state determination device and method capable of efficiently, accurately learning and estimating an abnormal state of an injection molding machine for each data acquired from the injection molding machine.

According to the present invention, the above problems are solved by creating learning data or state data based on time-series physical quantities (such as current and speed) acquired from an injection molding machine and classified at time intervals according to predetermined classification conditions and changing a plurality of learning models applicable at the time of learning or estimation according to the classification, for a state determination device comprising the learning models that learns, by machine learning, learning data (state variables) introduced from the time-series physical quantities acquired from the injection molding machine and estimates an abnormality degree.

In the machine learning, it is difficult to determine an abnormality corresponding to various conditions by a single learning model only. According to the present invention, however, there is provided an appropriate state determination device capable of implementing accurate determination of a plurality of abnormalities by properly using a plurality of learning models according to different processes constituting a molding process and of efficiently determining an abnormality according to the consumption period of components.

Moreover, the state determination device is provided with means for displaying a message and an icon representative of an abnormal state based on an abnormality degree obtained as an output of machine learning, stopping the operation of a moving part of a machine for the safety of a worker if the abnormality degree is not lower than a predetermined value, or stopping or decelerating a motor for driving the moving part.

One aspect of the present invention is a state determination device for determining an operating state of an injection molding machine, which comprises a data acquisitor configured to acquire data on the injection molding machine, a classification condition storage configured to store conditions for classifying the data on the injection molding machine acquired by the data acquisitor, a learning model storage configured to store a plurality of learning models, a data classifier configured to classify the data acquired by the data acquisitor, based on the classification conditions stored by the classification condition storage, and settle a learning model to which the classified data are applied, among the learning models to be stored in the learning model storage, and a learner configured to perform machine learning for the learning model settled as an application destination by the data classifier, based on the data classified by the data classifier.

Another aspect of the present invention is a state determination device for determining an operating state of an injection molding machine, which comprises a data acquisitor configured to acquire data on the injection molding machine, a classification condition storage configured to store conditions for classifying the data on the injection molding machine acquired by the data acquisitor, a learning model storage configured to store a plurality of learning models, a data classifier configured to classify the data acquired by the data acquisitor, based on the classification conditions stored by the classification condition storage, and settle a learning model to which the classified data are applied, among the learning models stored in the learning model storage, and an estimator configured to perform estimation using the learning model settled as an application destination by the data classifier, based on the data classified by the data classifier.

Still another aspect of the present invention is a state determination method for determining an operating state of an injection molding machine, which performs a data acquisition step for acquiring data on the injection molding machine, a data classification step for classifying the data acquired in the data acquisition step, based on conditions for classifying the data on the injection molding machine acquired in the data acquisition step, and settling a learning model to which the classified data are applied, among a plurality of learning models, and a processing step for performing processing related to the learning model settled as an application destination in the data classification step, based on the data classified in the data classification step, the processing step including a learning step for performing machine learning for the learning model concerned or an estimation step for performing estimation using the learning model concerned.

According to the present invention, data acquired from the injection molding machine can be assigned to an appropriate learning model based on classification conditions, so that an abnormal state of the injection molding machine can be learned or estimated efficiently and accurately.

BRIEF DESCRIPTION OF THE DRAWINGS

The above and other objects and features of the present invention will be obvious from the ensuing description of embodiments with reference to the accompanying drawings, in which:

FIG. 6 is a diagram showing a display example of an abnormal state; and

FIG. 7 is a diagram showing other examples of classification condition data.

DETAILED DESCRIPTION OF THE PREFERRED EMBODIMENTS

Several embodiments of the present invention will now be described with reference to the accompanying drawings.

Figure 1:
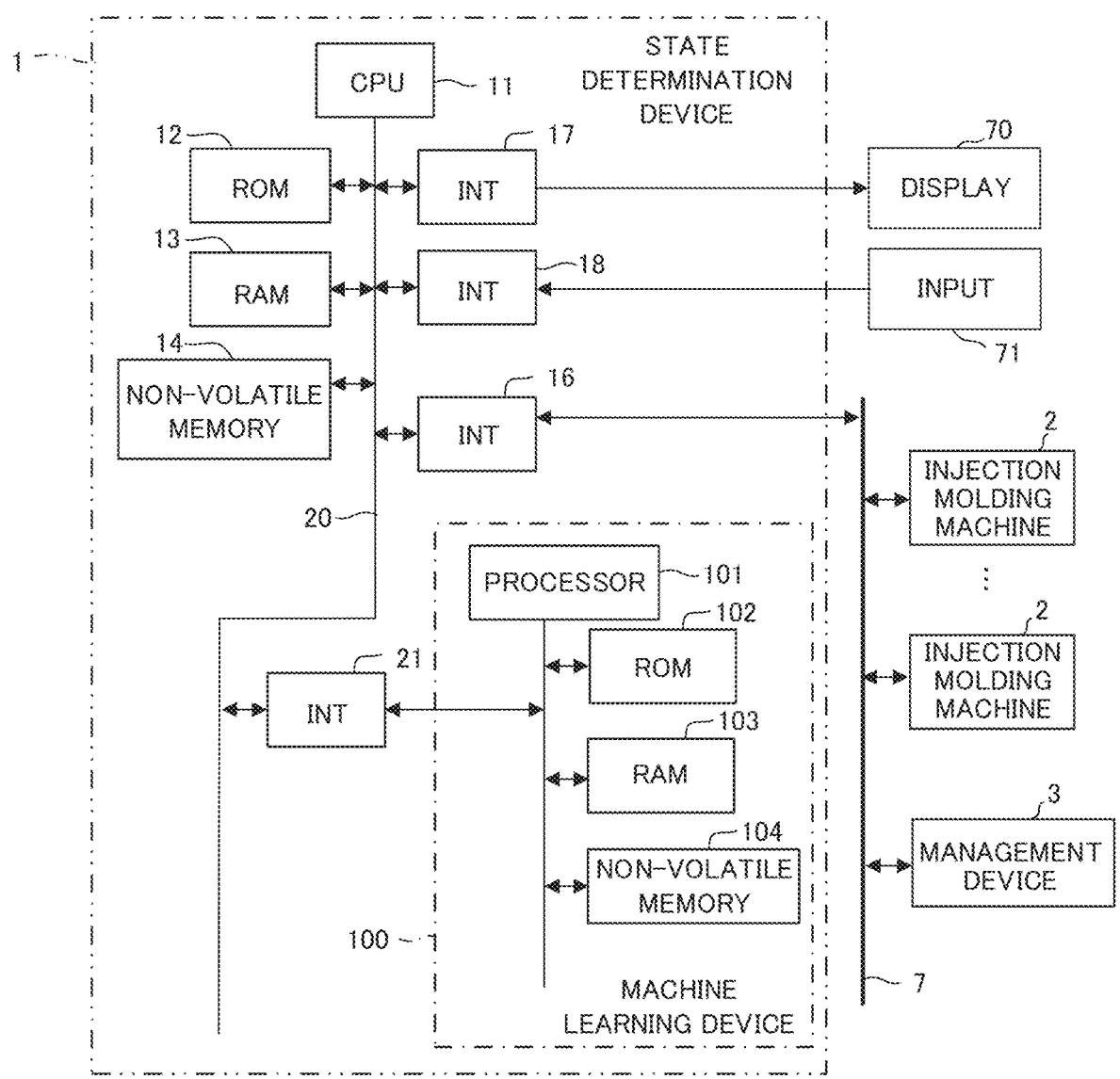
FIG. 1 is a diagram showing a schematic hardware configuration example of a state determination device according to the present invention.

FIG. 1 is a schematic hardware configuration diagram showing principal parts of a state determination device comprising a machine learning device according to an embodiment. A state determination device 1 of the present embodiment can be mounted on a controller for controlling injection molding machines, for example. Moreover, the state determination device 1 of the present embodiment can be implemented as a personal computer adjoined to the controller for controlling the injection molding machines, a management device 3 connected to the control device through a wired/wireless network or a computer such as an edge computer, cell computer, host computer or cloud server. In the present embodiment, the state determination device 1 is illustrated as being implemented as the computer connected to the control device for controlling the injection molding machines through the wired/wireless network.

The state determination device 1 according to the present embodiment includes a CPU (central processing unit) 11, which is a processor for generally controlling the state determination device 1. The CPU 11 reads out system programs stored in a ROM (read-only memory) 12 via a bus 20 and controls the entire state determination device 1 according to the system programs. The state determination device 1 includes a RAM (random access memory) 13, which is temporarily loaded with temporary calculation data, various data input by a worker through an input device 71 and the like.

The state determination device 1 includes a non-volatile memory 14, which is composed of, for example, a memory backed up by a battery (not shown) or an SSD (solid state drive) and its storage state can be maintained even when the state determination device 1 is powered off. The non-volatile memory 14 is stored with a setting area loaded with setting information on the operation of the state determination device 1, data input from the input device 71, and various data (such as the type of a machine, the mass and material of a mold, the type of a resin and signals for identifying processes) acquired from injection molding machines 2. In addition, the non-volatile memory 14 is stored with time-series data on various physical quantities (such as the temperature of a nozzle, the position, speed, acceleration, current, voltage, and torque of a motor for driving the nozzle, the temperature of the mold, the flow rate, flow velocity and pressure of the resin) detected during molding operations of the injection molding machines 2, data read through external storage devices (not shown) or the network, and the like. The programs and various data stored in the non-volatile memory 14 may be developed in the RAM 13 during execution and use. Moreover, the system programs, including a conventional analysis program for analyzing the various data, a program for controlling exchange with a machine learning device 100 (described later) and the like, are previously written in the ROM 12.

The state determination device 1 is connected to a wired/wireless network 7 through an interface (INT) 16. The wired/wireless network 7 is connected with at least one of the injection molding machines 2, the management device 3 for managing manufacturing work by the injection molding machine 2 concerned and the like, and exchanges data with the state determination device 1.

Each injection molding machine 2 is a machine configured to manufacture molded products of a resin such as plastic. The injection molding machine 2 melts the resin as a material and fills (injects) the melted resin into the mold to perform molding. The injection molding machine 2 comprises various pieces of equipment including the nozzle, the motor (prime mover), a transmission mechanism, a speed reducer and the moving part. The states of various parts are detected by sensors or the like and the operations of the various parts are controlled by the controller. For example, an electric motor, oil-hydraulic cylinder, oil-hydraulic motor or air motor may be used as the prime mover for the injection molding machine 2. Moreover, a ball screw, gears, pulleys or a belt may be used for the transmission mechanism for the injection molding machine 2.

Data read onto the memories, data obtained as the result of execution of the programs and the like, data output from the machine learning device 100 (described later), and the like are output through an interface 17 into a display 70, which then displays these data. Moreover, the input device 71, which is composed of a keyboard, pointing device and the like, delivers commands, data and the like based on the worker's operation to the CPU 11 through an interface 18.

The state determination device 1 includes an interface 21, which serves to connect the device 1 with the machine learning device 100. The machine learning device 100 comprises a processor 101, a ROM 102, a RAM 103 and a non-volatile memory 104. The processor 101 serves to control the entire machine learning device 100. The ROM 102 is stored with the system programs and the like. The RAM 103 serves for temporary storage in each step of processing related to machine learning. The non-volatile memory 104 is used to store learning models and the like. The machine learning device 100 can observe various pieces of information (e.g., various data, such as the type of the injection molding machine 2, the mass and material of the mold, and the type of the resin, and time-series data on various physical quantities, such as the temperature of the nozzle, the position, speed, acceleration, current, voltage, and torque of the motor for driving the nozzle, the temperature of the mold, the flow rate, flow velocity and pressure of the resin) that can be acquired by the state determination device 1 through the interface 21. Moreover, the state determination device 1 acquires the result of processing output from the machine learning device 100 and further stores, displays and sends the acquired result to another device through a network (not shown) or the like.

Figures 2, 3:
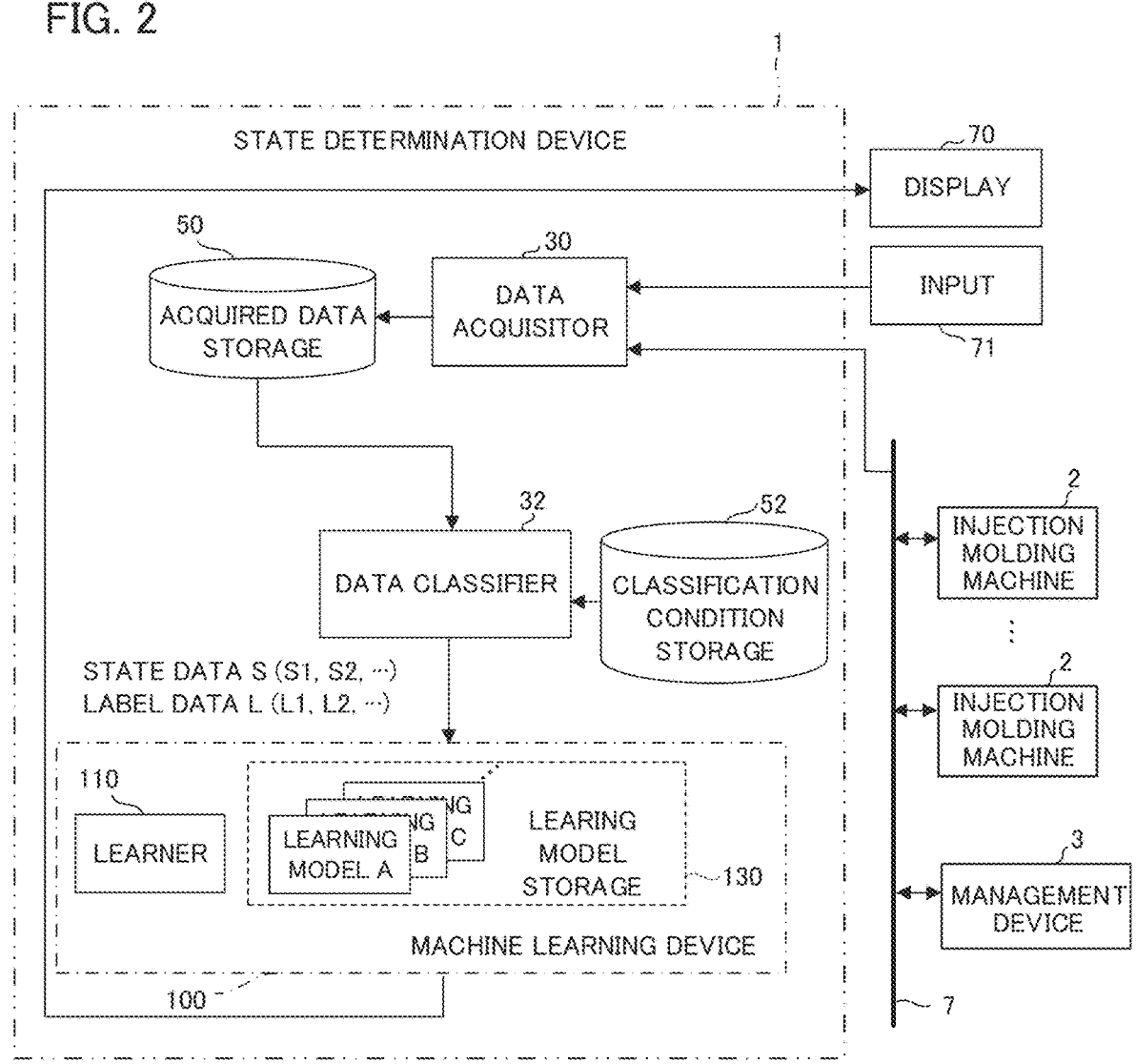
FIG. 2 is a schematic functional block diagram according to an embodiment of the state determination device according to the present invention.
FIG. 3 is a diagram showing an example of classification conditions.

FIG. 2 is a schematic functional block diagram of the state determination device 1 and the machine learning device 100 according to this embodiment of the present invention. The state determination device 1 shown in FIG. 2 has a structure required when the machine learning device 100 performs learning (learning mode). Each of functional blocks shown in FIG. 2 is implemented by the CPU 11 in the state determination device 1 and the processor 101 in the machine learning device 100 shown in FIG. 1 executing their respective system programs and control operations of the individual elements in the state determination device 1 and the machine learning device 100.

The state determination device 1 of the present embodiment comprises a data acquisitor 30 and a data classifier 32, and the machine learning device 100 in the state determination device 1 comprises a learner 110. Moreover, an acquired data storage 50 and a classification condition storage 52 are provided on the non-volatile memory 14. The acquired data storage 50 serves to store data acquired by the data acquisitor 30. The classification condition storage 52 is stored with conditions for classifying learning data, such as state data and label data, created based on the acquired data. A learning model storage 130 is provided on the non-volatile memory 104 in the machine learning device 100. The learning model storage 130 stores a plurality of learning models constructed by machine learning by the learner 110.

The data acquisitor 30 is functional means for acquiring various data input from the injection molding machine 2, input device 71 and the like. The data acquisitor 30 acquires, for example, various data, such as the type of the injection molding machine 2, the mass and material of the mold, and the type of the resin, time-series data on various physical quantities, such as the temperature of the nozzle, the position, speed, acceleration, current, voltage and torque of the motor for driving the nozzle, the temperature of the mold, and the flow rate, flow velocity and pressure of the resin and various data such as information on maintenance work of the injection molding machine input by the worker, and stores these data into the acquired data storage 50. The data acquisitor 30 may be configured to acquire the data from another device through the external storage (not shown) or the wired/wireless network.

The data classifier 32 is functional means for creating the learning data, obtained by classifying the data acquired by the data acquisitor 30 according to the classification conditions stored in the classification condition storage 52, and settling the learning model to which the created learning data are applied. The classification condition storage 52 is stored with at least one classification condition data that associates a conditional expression for classifying at least the learning data with identification information on the learning model to which the learning data classified based on conditions for the classification are applied. The data classifier 32 refers to the classification condition data stored in the classification condition storage 52 and classifies the learning data based on the referenced conditional expression, thereby settling the learning model to be an application destination. The learning data created by the data classifier 32 has a data format converted (or quantified, normalized, sampled and so on) into a unified form to be handled in the machine learning device 100. In the case where the machine learning device 100 performs unsupervised learning, for example, the data classifier 32 creates, as the learning data, state data S of a predetermined format in the learning concerned. If the machine learning device 100 performs supervised learning, the data classifier 32 creates, as the learning data, a set of state data S and label data L of a predetermined format in the learning concerned. Alternatively, if the machine learning device 100 performs reinforcement learning, the data classifier 32 creates, as the learning data, a set of state data S and determination data D of a predetermined format in the learning concerned.

FIG. 3 shows examples of the classification condition data stored in the classification condition storage 52. The classification condition data stored in the classification condition storage 52 may, for example, be data that associates a classification conditional expression defined as a condition for the state data included in the learning data with the identification information on the learning model to which the learning data that satisfies the classification conditional expression concerned. In the examples shown in FIG. 3, the classification conditional expression is based on conditions related to processes (including mold closing, injection, dwelling, metering, ejection, and mold opening processes) that constitute a one-cycle molding process in which the data acquired from the injection molding machine are acquired (or observed). The conditions are defined so that learning data acquired, for example, in the mold closing process are used for learning of a learning model A and that learning data acquired in the processes from the injection process to the dwelling process are used for learning of a learning model B.

Figures 4A, 4B:
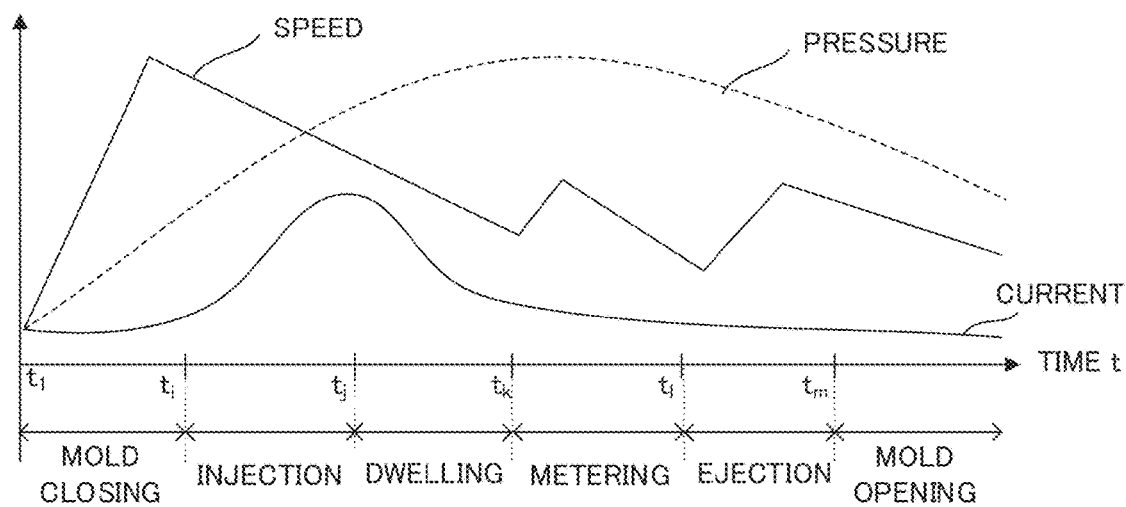
FIGS. 4A and 4B are diagrams showing an example of time-series data acquired by a data acquisitor.

FIGS. 4A and 4B show examples of the data acquired by the data acquisitor 30. The data acquired by the data acquisitor 30 include information for identifying the molding process that changes with the passage of time, in addition to time-series data such as the current, speed and pressure shown in FIG. 4A. As shown in FIG. 4B, for example, these pieces of information can be represented as time-series data on individual values at predetermined times. In FIG. 4B, numerals 1, 2, 3 and 4 denote the mold closing process, injection process, dwelling process and metering process, respectively, as identification information on the molding process.

If the data illustrated in FIGS. 4A and 4B are stored in the acquired data storage 50 and if the classification condition data illustrated in FIG. 3 are stored in the classification condition storage 52, the data classifier 32 divides the time-series data by a plurality of time intervals based on the identification information on the molding process. For example, the data classifier 32 generates the learning data to be applied to the learning model A from data obtained during a time duration $t_1$ to $t_i$ (mold closing process) and generates the learning data to be applied to the learning model B from data obtained during a time duration $t_{i+1}$ to $t_k$ (injection process). Thus, the data classifier 32 creates learning data by classifying the data acquired by the data acquisitor 30 (and stored in the acquired data storage 50) into the learning model as the application destination, according to the classification condition data stored in the classification condition storage 52.

The learner 110 performs machine learning using a learning model in which the individual data classified by the data classifier 32 are settled based on the result of the classification. The learning model storage 130 is configured to store a plurality of learning models (learning models A, B, C, . . . in FIG. 2) in an identifiable manner, and the learner 110 performs machine learning of the learning model as the application destination using the classified learning data, based on the result of the classification by the data classifier 32. If the destination learning model is not stored in the learning model storage 130, the learner 110 may create a new learning model as an application destination of the learning data concerned and store it into the learning model storage 130.

The learner 110 generates a learning model by performing machine learning using the data acquired from the injection molding machine 2, based on a conventional machine learning method such as the unsupervised learning, supervised learning, and reinforcement learning, and stores the generated learning model into the learning model storage 130. The method of the unsupervised learning performed by the learner 110 may be represented by, for example, the auto-encoder method or k-means method, while the supervised learning method may be represented by, for example, the multilayer perceptron method, recurrent neural network method, long short-term memory method or convolutional neural network method. The reinforcement learning method may be represented by, for example, the Q-learning method.

The learner 110 can perform unsupervised learning based on, for example, learning data acquired from the injection molding machine 2 in a normally operating state and classified by the data classifier 32 and generate, as a learning model, the distribution of learning data in a predetermined process acquired in a normal state. Using a plurality of learning models generated in this manner, an estimator 120 (described later) can estimate the extent of deviation of the learning data in the predetermined process acquired from the injection molding machine 2 from the learning data in the predetermined process acquired during the normal-state operation and calculate an abnormality degree as the result of the estimation.

Moreover, the learner 110 can, for example, perform supervised learning using learning data in the predetermined process in which a normal label is applied to the data in the predetermined process acquired from the normally operating injection molding machine and classified by the data classifier 32 and an abnormal label is applied to the data in the predetermined process acquired from the injection molding machine 2 before and after the occurrence of an abnormality and classified by the data classifier 32, thereby generating the discrimination boundaries between the normal and abnormal data as learning models in the predetermined process. Using the learning models generated in this manner, the estimator 120 (described later) can estimate whether the learning data in the predetermined process acquired from the injection molding machine 2 belong to the normal data or to the abnormal data and calculate a label value (normal/abnormal) as the result of the estimation and its degree of reliability.

In the state determination device 1 having the above structure, the learner 110 performs machine learning for the learning model as the application destination of the learning data concerned, using the learning data created by dividing the data acquired from the injection molding machine 2 by the time intervals according to the acquired process and classifying the acquired data. The individual learning models for which the machine learning is thus performed by the learner 110 are subjected to learning specialized for the individual processes that constitute the molding process, so that the state of the injection molding machine 2 in these processes can be efficiently learned.

Figure 5:
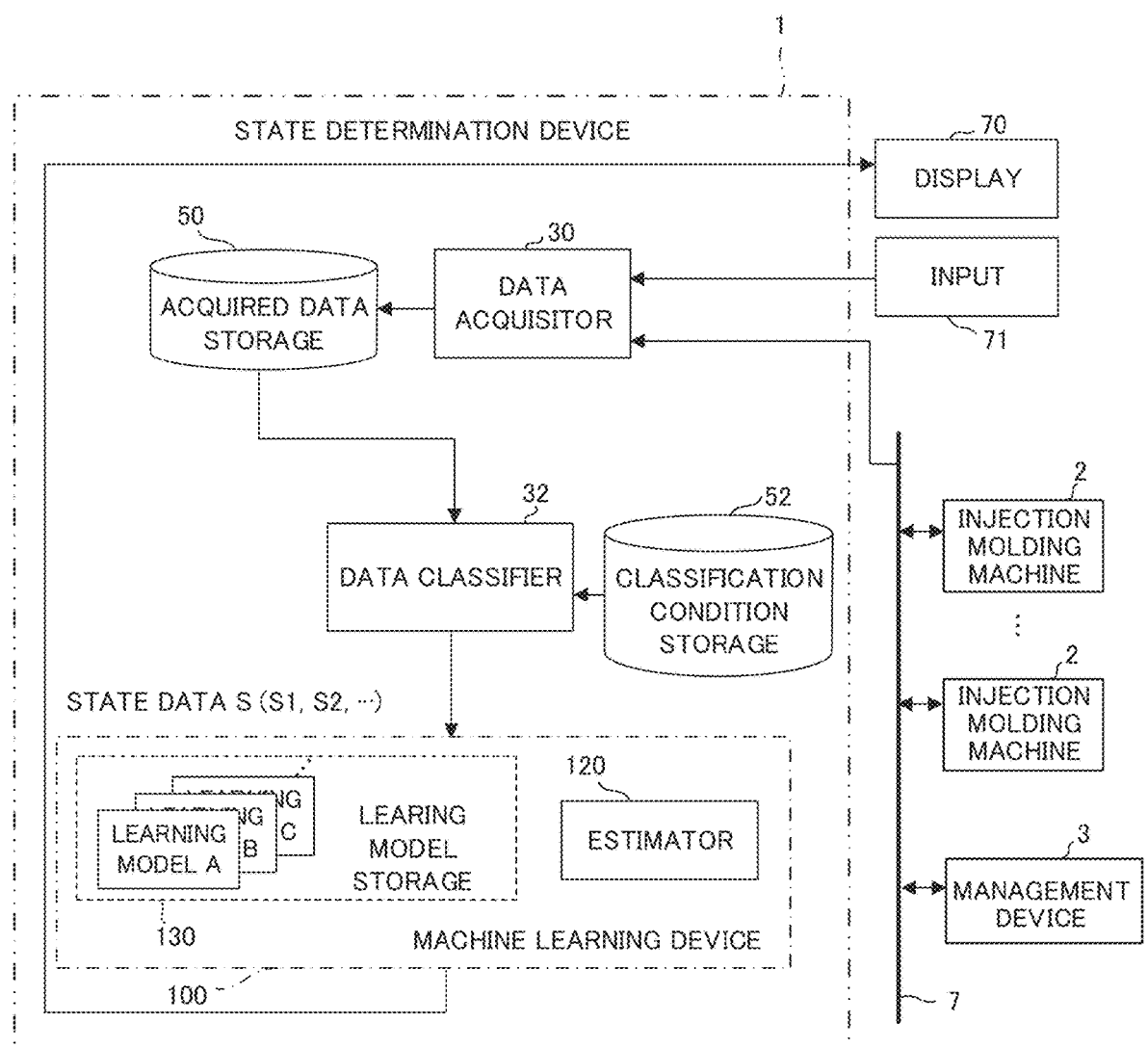
FIG. 5 is a schematic functional block diagram of a state determination device according to another embodiment of the present invention during learning operation.

FIG. 5 is a schematic functional block diagram of a state determination device 1 and a machine learning device 100, the state determination device 1 being configured to be another embodiment of the invention. The state determination device 1 according to the present embodiment has a structure required when the machine learning device 100 performs estimation (estimation mode). Each of functional blocks shown in FIG. 5 is implemented by the CPU 11 in the state determination device 1 and the processor 101 in the machine learning device 100 shown in FIG. 1 executing their respective system programs and control operations of the individual elements in the state determination device 1 and the machine learning device 100.

The state determination device 1 of the present embodiment, like that of the previous embodiment, comprises a data acquisitor 30 and a data classifier 32. The machine learning device 100 in the state determination device 1 comprises an estimator 120. Moreover, an acquired data storage 50 and a classification condition storage 52 are provided on a non-volatile memory 14. The acquired data storage 50 serves to store data acquired by the data acquisitor 30. The classification condition storage 52 is stored with conditions for classifying state data created based on the acquired data. A learning model storage 130 is provided on a non-volatile memory 104 in the machine learning device 100. The learning model storage 130 stores a plurality of learning models constructed by machine learning by a learner 110.

The data acquisitor 30 according to the present embodiment has the similar function to the data acquisitor 30 according to the previous embodiment. Moreover, the data classifier 32 in the present embodiment creates state data by classifying data acquired by the data acquisitor 30 (and stored in the acquired data storage 50) in the classification conditions stored in the classification condition storage 52 and settles the learning model to which the created state data are applied.

Based on the individual data classified by the data classifier 32, the estimator 120 estimates the state of the injection molding machine using the learning model settled as a result of the classification concerned. The learning model storage 130 is configured to store, in an identifiable manner, a plurality of learning models (learning models A, B, C, . . . in FIG. 2) generated by machine learning by the learner 110, and the estimator 120 performs estimation processing using the learning model as the application destination based on the classified state data, based on the result of the classification by the data classifier 32. If the destination learning model is not stored in the learning model storage 130, a message may be output to the effect that the estimation processing cannot be performed because of the absence of the destination learning model.

In the estimator 120 in the present embodiment, the abnormality degree related to the state of the injection molding machine is estimated and calculated and the class (normal/abnormal, etc.) to which the operating state of the injection molding machine belongs is estimated and calculated by inputting state data S classified by the data classifier 32 to the learning model generated by the learner 110 (or for which parameters are settled). The result of the estimation by the estimator 120 (the abnormality degree related to the state of the injection molding machine, the class to which the operating state of the injection molding machine belongs, etc.) may be used by being output for display on a display 70 or output for transmission through a wired/wireless network (not shown) to a host computer, cloud computer or the like. Moreover, if the result of the estimation by the estimator 120 proves to be a predetermined state (e.g., if a predetermined threshold is exceeded by the abnormality degree estimated by the estimator 120 or if the class to which the operating state of the injection molding machine estimated by the estimator 120 belongs is found to be "abnormal"), a warning message 172 and a warning icon 174 may be output for display on a screen 170 in the display 70, as illustrated in FIG. 6, for example, or a command for suspension of operation, deceleration or restriction of the motor torque may be output to the injection molding machine.

In the state determination device 1 having the above structure, the estimator 120 performs estimation of the state of the injection molding machine 2 based on the learning model as the application destination of the state data concerned, using the state data created by dividing the data acquired from the injection molding machine 2 by the time intervals according to the acquired process and classifying the divided data. The learning models stored in the learning model storage 130 are subjected to learning specialized for the individual processes that constitute the molding process, so that a relatively high accuracy can be expected to be maintained for the estimation of the state of the injection molding machine 2 using the learning models concerned.

While embodiments of the present invention have been described above, the invention is not limited to the above-described embodiments and may be suitably modified and embodied in various forms.

For example, although the state determination device 1 and the machine learning device 100 are described as being devices that respectively comprise different CPUs (Central Processing Units) in the above embodiments, the machine learning device 100 may alternatively be implemented by the CPU 11 in the state determination device 1 and the system programs stored in the ROM 12 in the state determination device 1.

Moreover, although the state determination device 1 is described as being mounted on the computer connected to the control device of the injection molding machine 2 through the network 7 in the above embodiments, it may alternatively be implemented with the arrangement of various constituent elements suitably changed. For example, only a part/some parts of the machine learning device 100 may be mounted on the host computer, while the main body of the state determination device 1 including the data acquisitor 30 and the data classifier 32 may be mounted on the edge computer.

In the embodiments described above, the classification condition storage 52 is illustrated as being configured so that the data acquired from the injection molding machine 2 are classified for each process as a condition for data classification. Alternatively, however, a plurality of learning models with different degrees of urgency of a detectable abnormal state may be previously created and stored in the learning model storage 130. As illustrated in FIG. 7, in this case, the classification condition storage 52 may be stored with a condition related to the number of manufacturing cycles for which a molded product is manufactured on each occasion by the injection molding machine 2 in association with the identification information on the learning model. In this available configuration, the data classifier 32 settles the destination learning model according to the order of the cycle in which the data are acquired by the data acquisitor 30. According to this configuration, the state determination device 1 can be constructed so as to be able to change the frequency of abnormality estimation (the number of cycles for which the estimation processing is performed on each occasion). The state determination device 1 of this type does not perform the estimation processing for low-urgency abnormality for each manufacturing cycle, so that the calculation cost of the state determination device 1 can be suppressed.

The invention claimed is:

1. A state determination device for determining an operating state of an injection molding machine, the state determination device comprising:
    a processor configured to acquire data on the injection molding machine, wherein the data on the injection molding machine include time-series data; and
    a memory storing
        (i) classification conditions for classifying the data on the injection molding machine, wherein the classification conditions include a condition for dividing the time-series data by a time interval, and the time interval is at least one of a plurality of intervals in a molding process of the injection molding machine, and
        (ii) a plurality of learning models, wherein each of the plurality of learning models is associated with an interval of the plurality of intervals in the molding process; wherein
    the processor is configured to
        divide the time-series data by the time interval based on the classification conditions,
        classify the data based on the classification conditions,
        settle a learning model, to which the classified data are applied, among the plurality of learning models,
        perform machine learning for the learning model settled as an application destination based on the classified data, and
        manage the injection molding machine by outputting a command based on the learning model.

2. A state determination device for determining an operating state of an injection molding machine, the state determination device comprising:
    a processor configured to acquire data on the injection molding machine, wherein the data on the injection molding machine include time-series data;
    a memory storing
        (i) classification conditions for classifying the data on the injection molding machine, wherein the classification conditions include a condition for dividing the time-series data by a time interval, and the time interval is at least one of a plurality of intervals in a molding process of the injection molding machine, and
        (ii) a plurality of learning models, wherein each of the plurality of learning models is associated with an interval of the plurality of intervals in the molding process; wherein
    the processor is configured to
        divide the time-series data by the time interval based on the classification conditions,
        classify the data based on the classification conditions,
        settle a learning model to which the classified data are applied, among the plurality of learning,
        perform estimation of an abnormality related to the operating state of the injection molding machine using the learning model settled as an application destination, based on the classified data, and
        in response to estimating the operating state as being abnormal, output at least one of commands for suspension of operation of the injection molding machine, deceleration of motor torque to the injection molding machine, or restriction of the motor torque to the injection molding machine.

3. The state determination device according to claim 1, wherein
    the time interval is the at least one of the plurality of intervals in the molding process of the injection molding machine including mold closing interval, mold clamping interval, injection interval, dwelling interval, metering interval, mold opening interval, ejection interval, or standby interval.

4. The state determination device according to claim 1, wherein
    the classification conditions include a further condition for classifying the data with every predetermined one of manufacturing cycles of the injection molding machine; and
    the processor is configured to classify the data according to an order of a cycle concerned in the manufacturing cycles of the injection molding machine, based on the classification conditions.

5. The state determination device according to claim 2, wherein
    the classification conditions include a further condition for classifying the data with every predetermined one of manufacturing cycles of the injection molding machine; and
    the processor is configured to classify the data according to an order of a cycle concerned in the manufacturing cycles of the injection molding machine, based on the classification conditions.

6. The state determination device according to claim 1, wherein
    the processor is configured to perform at least one of supervised learning, unsupervised learning, or reinforcement learning.

7. The state determination device according to claim 2, wherein
    the processor is configured to cause a display to display a warning message in response to estimating the operating state as being abnormal.

8. The state determination device according to claim 2, wherein
    the processor is configured to cause a display to display a warning icon in response to estimating the operating state as being abnormal.

9. The state determination device according to claim 1, wherein
    the processor is configured to acquire further data from a plurality of injection molding machines connected through a wired or wireless network.

10. The state determination device according to claim 1, wherein
    the state determination device is mounted on a management device connected to the injection molding machine through a wired or wireless network and configured to manage the injection molding machine.

11. A state determination method of determining an operating state of an injection molding machine, the state determination method comprising:
    acquiring data on the injection molding machine, wherein the data on the injection molding machine include time-series data;
    dividing the time-series data by a time interval based on classification conditions for classifying the data on the injection molding machine, wherein the time interval is at least one of a plurality of intervals in a molding process of the injection molding machine;

classifying the data based on the classification conditions;

settling a learning model, to which the classified data are applied, among a plurality of learning models, wherein each of the plurality of learning models is associated with an interval of the plurality of intervals in the molding process;

performing processing related to the learning model settled as an application destination based on the classified data, the performing the processing including performing machine learning for the settled learning model, or performing estimation using the settled learning model; and managing the injection molding machine by outputting a command based on a result of the performing the processing related to the settled learning model.

\* \* \* \* \*